US012255786B1

(12) United States Patent
Bedford

(10) Patent No.: US 12,255,786 B1
(45) Date of Patent: Mar. 18, 2025

(54) APPARATUS AND A METHOD FOR IDENTIFYING A COMMON ACQUISITION SIGNAL

(71) Applicant: Pathformance Technologies, Inc., Naples, FL (US)

(72) Inventor: Christopher Bedford, Naples, FL (US)

(73) Assignee: Pathformance Technologies Inc., Naples, FL (US)

( * ) Notice: Subject to any disclaimer, the term of this patent is extended or adjusted under 35 U.S.C. 154(b) by 0 days.

(21) Appl. No.: 18/375,592

(22) Filed: Oct. 2, 2023

(51) Int. Cl.
*H04L 41/16* (2022.01)
*H04L 67/306* (2022.01)

(52) U.S. Cl.
CPC ............ *H04L 41/16* (2013.01); *H04L 67/306* (2013.01)

(58) Field of Classification Search
CPC .............................. H04L 41/16; H04L 67/306
See application file for complete search history.

(56) References Cited

U.S. PATENT DOCUMENTS

| | | | |
|---|---|---|---|
| 7,937,286 B2 | 5/2011 | Newman | |
| 8,949,351 B2 | 2/2015 | Ciancio-Bunch | |
| 11,900,426 B1* | 2/2024 | Steele, III | G06Q 30/0206 |
| 2013/0268335 A1* | 10/2013 | Cooper | G06Q 30/0217 705/14.19 |
| 2014/0279420 A1* | 9/2014 | Okerlund | G06Q 20/387 705/39 |
| 2015/0310481 A1* | 10/2015 | Brown | G06Q 30/0243 705/14.42 |
| 2016/0132924 A1* | 5/2016 | Thirugnanasundaram | G06Q 30/0261 705/14.5 |
| 2016/0253690 A1* | 9/2016 | Richardson | G06Q 20/203 705/7.35 |
| 2017/0372337 A1* | 12/2017 | Han | G06Q 30/0202 |
| 2018/0247325 A1* | 8/2018 | Melzer | G06Q 30/0206 |
| 2020/0387935 A1* | 12/2020 | Reichel | G06Q 30/0277 |
| 2021/0233097 A1* | 7/2021 | Doumar | G06F 21/32 |
| 2022/0394126 A1* | 12/2022 | Nitidharmatut | H04L 51/02 |
| 2022/0398635 A1* | 12/2022 | Jungmeisteris | G06Q 50/01 |

FOREIGN PATENT DOCUMENTS

WO  WO-2016018853 A1 * 2/2016 ............. G06Q 20/20

* cited by examiner

*Primary Examiner* — Kostas J Katsikis
(74) *Attorney, Agent, or Firm* — Caldwell Intellectual Property Law

(57) ABSTRACT

An apparatus for identifying a common acquisition signal is disclosed. The apparatus comprises at least a processor and a memory communicatively connected to the at least a processor. The memory instructs the processor to receive an entity profile from a user, wherein the entity profile comprises a plurality of transmission configuration data. The memory instructs the processor to identify a plurality of signal destinations as a function of the transmission configuration data. The memory instructs the processor to receive return signals from the plurality of signal destinations. The memory instructs the processor to generate optimized transmission configuration data as a function of the plurality of return signals. The memory instructs the processor to determine a common acquisition signal associated with the plurality of signal destinations as a function of the optimized transmission configuration data. The memory instructs the processor to display the common acquisition signal using a display device.

18 Claims, 9 Drawing Sheets

APPARATUS AND A METHOD FOR IDENTIFYING A COMMON ACQUISITION SIGNAL

FIELD OF THE INVENTION

The present invention generally relates to the field of return signal optimization. In particular, the present invention is directed to an apparatus and a method for identifying a common acquisition signal.

BACKGROUND

Identifying a plurality of signal destinations to maximize the number of successful return signals received based on an entity profile can be a challenging proposition. Furthermore, it can be challenging to select proper transmission configuration data with which to reach that plurality of signal destinations to maximize the return signals received.

SUMMARY OF THE DISCLOSURE

In an aspect, an apparatus for identifying a common acquisition signal is described. The apparatus includes at least a processor and a memory communicatively connected to the at least a processor, wherein the memory containing instructions configuring the at least a processor to receive an entity profile from a user, wherein the entity profile includes a plurality of transmission configuration data, identify a plurality of signal destinations as a function of the transmission configuration data, and receive a plurality of return signals from the plurality of signal destinations. The memory further configuring the processor to generate optimized transmission configuration data as a function of the plurality of return signals, wherein generating the optimized transmission configuration data includes determining a common acquisition signal associated with the plurality of signal destinations as a function of the optimized transmission configuration data. The memory further configuring the processor to present the common acquisition signal using a display device.

In another aspect, a method for identifying a common acquisition signal is described. The method includes receiving, using at least a processor, an entity profile from a user, wherein the entity profile includes a plurality of transmission configuration data. The method further includes identifying, using the at least a processor, a plurality of signal destinations as a function of the transmission configuration data. The method further includes receiving a plurality of return signals from the plurality of signal destinations. The method further includes generating, using the at least a processor, optimized transmission configuration data as a function of the plurality of return signals, wherein generating the optimized transmission configuration data includes determining a common acquisition signal associated with the plurality of signal destinations as a function of the optimized transmission configuration data. The method further includes presenting, using the at least a processor, the common acquisition signal using a display device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for identifying a common acquisition signal. The apparatus comprises at least a processor and a memory communicatively connected to the at least a processor. The memory may instructs the processor to receive an entity profile from a user, wherein the entity profile comprises a plurality of transmission configuration data. The memory may instructs the processor to identify a plurality of signal destinations as a function of the transmission configuration data. The processor can receive return signals from the plurality of signal destinations. The memory instructs the processor to generate optimized transmission configuration data as a function of the return signals, which may include determining a common acquisition signal associated with the plurality of signal destinations as a function of the optimized transmission configuration data. The memory may instructs the processor to display the common acquisition signal using a display device. Exemplary embodiments illustrating aspects of the present disclosure are described below in the context of several specific examples.

Figure 1:
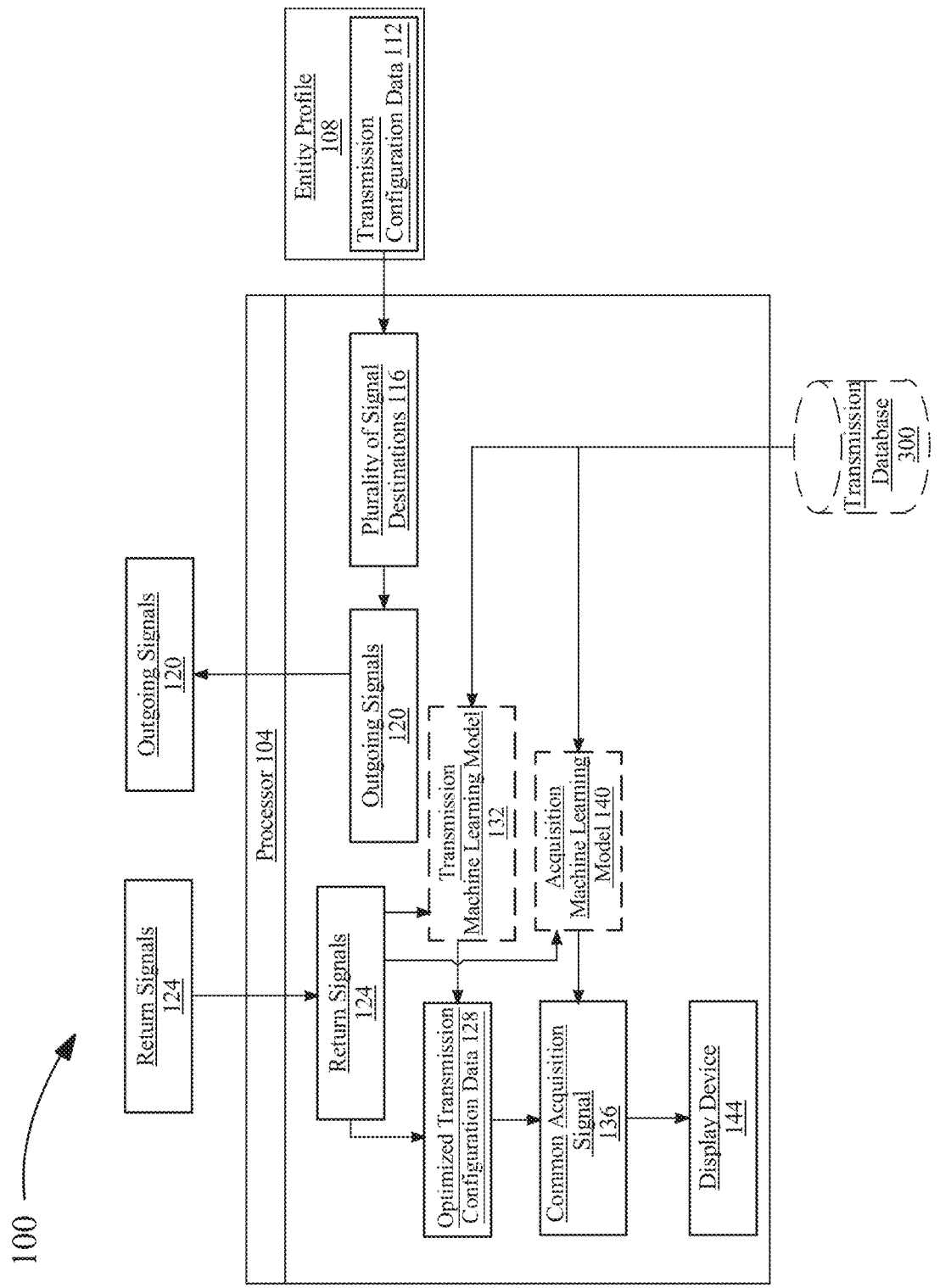
FIG. 1 is a block diagram of an exemplary embodiment of an apparatus for identifying a common acquisition signal.

Referring now to FIG. 1, an exemplary embodiment of apparatus 100 for identifying a common acquisition signal is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. The memory may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 is configured to receive an entity profile 108 from a user, wherein entity profile 108 comprises a plurality of entity data. For the purposes of this disclosure, an "entity profile" is a representation of information and/or data associated with an entity. An entity profile 108 may be made up of a plurality of entity data. As used in the current disclosure, "entity data" is information associated with the entity. An entity profile 108 may be created by a processor 104, a user, or a third party. As used in the current disclosure, an "entity" is a person or a group of people with a common objective. An entity may include a corporation, a business, an organization, a retail store, an individual, and the like. The entity profile 108 may include information regarding the entity's sales history, revenue, customers, products, customer demographics, inventory, and the like. Entity data may be provided by a user directly, database, third-party application, remote device, immutable sequential listing, social media profile, and the like. Entity data may be generated using the responses to a chatbot. Chatbots are discussed in greater detail with respect to FIG. 7.

With continued reference to FIG. 1, an entity profile 108 may include transmission configuration data 112. For the purpose of this disclosure, "transmission configuration data" is information related to a transmission strategy. A "transmission strategy," as used in the current disclosure, is a plan of action designed to achieve specific goals and objectives with regard to return signals received in response to signals sent to signal destinations. In some embodiments, a transmission strategy may include a sales strategy. A transmission strategy may include entities' promotional efforts to allocate its resources across a wide range of platforms, and channels to increase its sales and achieve sustainable competitive advantage within its corresponding market. Transmission configuration data 112 may include information regarding the prices of goods and services of the entity. Transmission configuration data 112 may include information regarding the wholesale price, retail price, profit margin, sales numbers, and the like. Transmission configuration data 112 may include a listing of the available sales promotions. This may include but is not limited to a temporary price reduction, free shipping/free returns, flash sales, bulk sales (i.e. the more you buy the more you save), product giveaways, loyalty programs, coupons, competitions, price matching, holiday promotions, and the like.

With continued reference to FIG. 1, entity profile 108 may include user statistics. As used in the current disclosure, a "user statistic" is a static regarding the demographic information regarding a customer or a potential customer of the entity. User statistics may include any of the following personal information: age, height, gender, credit, geographical location, financial information, criminal history, medical history, education, profession, personal interests, and the like. User statistics may additionally include records associated with a consumer, such as personal address, social security number, phone number, employment history, social media factors, geographical location, income level, consumer preferences, consumer purchase history, a consumer's digital footprint, and the like. As used in the current disclosure, a "digital footprint" is a collection of data that is left behind as a result of a consumer's online activities. This can include any information that is shared or collected through the use of digital devices and services, such as smartphones, social media platforms, search engines, and online shopping sites. A non-limiting example, a digital footprint may include social media activity, search history, online shopping history, cookies and website tracking, location data, application usage data. Social media activity may include posts, likes, comments, shares, and messages on various social media platforms. Search history may include a record of the consumer's search queries, including the terms they searched for and the links they clicked on. Online shopping history may include purchases made on e-commerce sites that indicate a record of a consumer's shopping preferences and habits. Websites may use cookies or other tracking technologies to monitor a consumer's activity and gather information about their browsing behavior. Location data may include a consumer's location through GPS tracking, which can be used to target them with location-based advertising. App usage data may include apps installed on a consumer's device which may collect data about their usage habits, such as how often they use the app, what features they use, and what content they access. In some embodiments, cookies may be used generate the digital footprint of the user. Cookies are small text files that websites and online services can place on a user's device to track their online activity. Cookies work by sending a small amount of data from a website to a user's browser, which is then stored on the user's device. When the user visits the same website again, the browser sends the cookie data back to the website, allowing the website to remember the user's preferences and settings. There are two main types of cookies: session cookies and persistent cookies. Session cookies are temporary cookies that are deleted when the user closes their browser. Persistent cookies, on the other hand, remain on the user's device even after the browser is closed and can be used to remember the user's preferences for future visits to the website. While cookies can be useful for providing personalized experiences and improving website performance, they can also be used to track a user's digital footprint. By using cookies to track a user's online activity, processor 104 can build a detailed entity profile 108 that includes all or a significant portion of the user's interests, behaviors, and preferences.

With continued reference to FIG. 1, an entity profile 108 may be received by processor 104 through user input. For example, and without limitation, the user or a third party may manually input entity profile 108 using a graphical user interface of processor 104 or a remote device, such as for example, a smartphone or laptop. Entity profile 108 may additionally be generated via the answer to a series of questions. The series of questions may be implemented using a chatbot, as described herein below. A chatbot may be configured to generate questions regarding any element of entity profile 108, entity data, transmission configuration data 112, and the like. In a non-limiting embodiment, a user may be prompted to input specific information or may fill out a questionnaire. In an embodiment, a graphical user interface may display a series of questions to prompt a user for information pertaining to entity profile 108. Entity profile 108 may be transmitted to processor 104, such as using wired or wireless communication, as previously discussed in this disclosure. Entity profile 108 can be retrieved from multiple third-party sources including the user's inventory records, financial records, human resource records, past entity profiles 108, sales records, user notes and observations, and the like. Entity profile 108 may be placed through an encryption process for security purposes.

With continued reference to FIG. 1, Entity profile 108 may include entity records. As used in the current disclosure, an "entity record" is a document that contains information regarding the entity. Entity records may include client demographics, sales records, and inventory records. Entity record may include things like client files, invoices, time cards, driver's license databases, news articles, social media profiles and/or posts, and the like. Entity records may be identified using a web crawler. User records may be converted into machine-encoded text using an optical character reader (OCR).

Still referring to FIG. 1, in some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases, a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of apriori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, entity profile 108 may be generated using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to compile entity profile 108 and transmission configuration data 112. The web crawler may be seeded and/or trained with a reputable website, such as the user's business website, to begin the search. A web crawler may be generated by processor 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract user records, inventory records, financial records, human resource records, past entity profiles 108, social media profiles, sales records, user notes, and observations, based on criteria such as a time, location, and the like.

With continued reference to FIG. 1, processor 104 identifies a plurality of signal destinations 116 as a function of the transmission configuration data 112. As used in the current disclosure, a "signal destination" is a device that receives an electronic communication signal. Selection of a signal destination may include, without limitation, selection of a communication network path to one or more uniform resource locators (URLs), one or more media access control addresses, one or more internet protocol addresses, one or more device identification numbers, one or more serial numbers, one or more email addresses, one or more phone numbers, one or more identification for advertisers (IDFA) identifiers, one or more Google advertiser identification (GAID) identifiers, one or more local internet protocol addresses, and the like. In some embodiments, a signal destination may include a user or a customer. In some embodiments, a signal destination may include device identifier; as a non-limiting example, this may include an internet protocol (IP) address, a media access control (MAC) address, an email address, a telephone number, a social media handle or username, a user identifier, and the like. [e.g. a particular method of contacting a user or customer] In some embodiments, signal destination may include particular stores, registers, points of sale, and the like.

With continued reference to FIG. 1, plurality of signal destinations 116 may be identified as a function of a target group. For the purposes of this disclosure, a "target group" is a client demographic to which transmission strategy is targeted. A target group and/or plurality of signal destinations 116 may include consumers who exhibit similar characteristics (such as age, location, income, profession, or lifestyle) and are considered most likely to purchase goods or services from the entity. A target group and/or plurality of signal destinations 116 may be identified for each product and/or service an entity offers. A target group and/or plurality of signal destinations 116 may be identified as a function of a user statistic. This may be done using historical versions of user statistics or target groups for products and services that a similar to the current products or services that the entity is trying to promote. In an embodiment, historical versions of user statistics, target groups, and/or plurality of signal destinations 116 may be stored in a database such as database 300. A plurality of signal destinations 116 may refer to a specific group of people that a product, service, or transmission strategy is designed for. The client demographic can be defined by various factors such as age, gender, income level, education, occupation, interests, and lifestyle. By identifying a plurality of signal destinations 116, processor 104 may be configured to tailor transmission configuration data 112 to effectively reach and engage with their intended audience. In a non-limiting example, a toy company may target children between the ages of 5-12, or a luxury car brand may target affluent individuals with a high-income level. A plurality of signal destinations 116 may be generated by evaluating the characteristics and behaviors of the specific previous clients as detailed in the entity profile 108. In a non-limiting example, if an entity is launching a new line of beauty products, processor 104 may identify a plurality of signal destinations 116 as women between the ages of 18-35 who are interested in cosmetics and skincare. Processor 104 may further refine this demographic by identifying additional factors such as income level, geographic location, social media presence, previous purchases, lifestyle, and the like. By doing so, the company can create targeted advertising and promotional campaigns that will be most effective in reaching and engaging with this specific group of potential customers.

With continued reference to FIG. 1, a plurality of signal destinations 116 may include a control group. As used in the current disclosure, a "control group" are a group of individuals who are not exposed to any sales strategies or are not exposed to an optimized sales strategy. The purpose of the control group may be to provide a baseline for comparison with the signal destinations that receive the transmissions. A control group may be used to evaluate the effectiveness of a transmission strategy and/or sales strategy. By comparing the behavior of the plurality of signal destinations 116 and the control group, a processor 104 can determine whether the transmission strategy and/or sales strategy had a significant impact on sales. The control group provides a baseline for comparison, allowing the processor to determine whether any changes in behavior are due to the advertising or other factors. Control groups may be used to determine whether any effects of a transmission strategy are due to the effectiveness of the strategy or due to other factors, such as chance or placebo effects. By comparing the outcomes of the plurality of signal destinations 116 with those of the control group, processor 104 can estimate the magnitude of the sales strategies effect and determine whether it is statistically significant.

With continued reference to FIG. 1, processor 104 may identify plurality of signal destinations 116 using a lookup table. A "lookup table," for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in static program storage, calculated as part of a program's initialization phase, or even stored in hardware in application-specific platforms. Data within the lookup table may include previous examples of plurality of signal destinations 116 compared to entity data, transmission configuration data 112, and/or customer demographics. Data within the lookup table may be received from database 300. Lookup tables may also be used to identify plurality of signal destinations 116 by matching an input value to an output value by matching the input against a list of valid (or invalid) items in an array. In a non-limiting example, entity data may reflect that the entity is trying to sell high-end watches. Examples of plurality of signal destinations 116 may indicate that historically purchasers of high-end watches are usually males between the age of 30-65 who live in a major metropolitan area. A lookup table may look up the user's entity data as an input and output a plurality of signal destinations 116 tailored to the transmission configuration data 112. Processor 104 may be configured to "lookup" or input one or more entity profile 108, entity data, demographic data, transmission configuration data, and the like. Whereas the output of the lookup table may comprise a plurality of signal destinations 116. Data from the lookup table may be compared to examples plurality of signal destinations 116, for instance, and without limitation using string comparisons, numerical comparisons such as subtraction operations, or the like. Alternatively or additionally, a query representing elements of entity data or transmission configuration data 112 may be submitted to the lookup table and/or a database, and an associated plurality of signal destinations 116 stored in a data record within the lookup table and/or a database may be retrieved using the query.

With continued reference to FIG. 1, processor 104 may be configured to identify the plurality of signal destinations using a target classifier. As used in the current disclosure, a "target classifier" is a classifier that is configured to create a plurality of signal destinations 116. Target classifier may be consistent with the classifier described below in FIG. 2. Inputs into the target classifier may include transmission configuration data 112, entity profile 108, examples of plurality of signal destinations 116, and the like. The output of the target classifier may comprise an identification of a target group. Target training data may include a plurality of data entries containing a plurality of inputs that are correlated to a plurality of outputs. Target training data may include a plurality of transmission configuration data 112 correlated to a plurality of examples of target groups. Target training data may be received from a database such as database 300 of FIG. 3. Target training data may contain information about transmission configuration data 112, entity profile 108, examples of plurality of signal destinations 116, and the like. Target training data may be generated from previous iterations of identification of plurality of signal destinations 116. In some embodiments, target training data may be iteratively updated with in the input and output results of the target classifier using a feedback loop. This may be done with the goal to generate a more tailored machine learning model. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, processor 104 may be configured to determine plurality of signal destinations 116 as a function of target group. In some embodiments, processor 104 may retrieve signal destinations 116 from a database, such as transmission database 300 as described further with reference to FIG. 3. Processor 104 may filter signal destinations using target group to determine plurality of signal destinations 116. As a non-limiting example, processor 104 may filter signal destinations based on a target age of target group. As a non-limiting example, if the target age is 18-24 years old, processor may filter out signal destinations that are not associated with an age of 18-24 years old. As a non-limiting example, processor 104 may filter signal destinations based on a target demographic of target group. As a non-limiting example, if the target demographic is married men, processor may filter out signal destinations that are not associated with married men.

With continued reference to FIG. 1, processor 104 may be configured to send an outgoing signal 120 to one or more of the plurality of signal destinations 116. A "signal," for the purposes of this disclosure, is an intelligible representation of data that is communicated from one device to another. As a non-limiting example, outgoing signal 120 may include a communication between computing devices. As a non-limiting example, outgoing signal 120 may include a digital communication. For example, digital communication may include an email, a text message, an instant message, SMS, MMS, and the like. In some embodiments, outgoing signal 120 may include communications regarding transmission configuration data 112 and/or sales strategy; as a non-limiting example, this may include promotions such as, buy one get one free, referral rewards, discounts, loyalty programs, and the like. In some embodiments, processor 104 may be configured to send outgoing signal 120 to signal destinations in plurality of signal destinations 116 that are not part of a control group.

With continued reference to FIG. 1, processor 104 is configured to receive a plurality of return signals 124. A "return signal," for the purposes of this disclosure, is a signal that is received in response to an outgoing signal sent to a signal destination. Return signal 124 may include a communication from a prospective customer or client, such as an email, text message, SMS, MMS, instant message, phone call, voicemail, social media post, and the like. Return signal 124 may include data indicating that a customer, client, person, business, and the like has engaged with an outgoing signal 120 sent by processor 104. As non-limiting examples, this may include an indication that a text message, email, instant message, and the like was received and/or read. In some embodiments, return signal may include data regarding a purchase made in response to outgoing signal 120 from processor 104.

With continued reference to FIG. 1, return signals 124 may include one or more successful return signals. A "successful return signal," for the purposes of this disclosure, is a return signal that is indicative of a desired engagement with an outgoing signal 120 sent by processor 104. As a non-limiting example, successful return signal may include a completed purchase at a point of sale. As a non-limiting example, successful return signal may include a response to a digital communication. As a non-limiting example, successful return signal may include a recipient engaging with or reading digital communication.

With continued reference to FIG. 1, return signals 124 may include one or more unsuccessful return signals. An "unsuccessful return signal, for the purposes of this disclosure, is a return signal that is indicative of an undesired engagement with an outgoing signal 120 sent by processor 104. As a non-limiting example, unsuccessful return signal may include a digital communication that is not responded to or engaged with. As a non-limiting example, unsuccessful return signal may include a digital communication that does not result in a sale. In some embodiments, a lack of return signal in response to a signal sent by processor 104 may be considered to be "unsuccessful" or an unsuccessful return signal.

With continued reference to FIG. 1, processor 104 may calculate a success metric as a function of the plurality of return signals 124. As a non-limiting example, success metric may be a function of the number of return signals 124 received. In some embodiments, success metric may include a percentage of return signals 124 received for a number of signals sent to signal destinations 116. In some embodiments, success metric may include a percentage of successful return signals 124 received for a number of outgoing signals 120 sent to signal destinations 116. In some embodiments, success metric may include a control success metric, wherein the success metric is calculated as a function of return signals 124 received from signal destinations 116 that are in control group.

With continued reference to FIG. 1, processor 104 generates optimized transmission configuration data 128 as a function of the plurality of return signals 124. As used in the current disclosure, "optimized transmission configuration data" is transmission configuration data that has been adjusted or otherwise altered to increase reception of successful return signals. Optimization refers to the process of finding the best solution or approach to a particular problem, given certain constraints or limitations. In the current case, optimization involves finding a transmission strategy, represented by transmission configuration data 112, that is tailored to a plurality of signal destinations 116. An optimal transmission configuration may be a strategy that entices a consumer to engage in economic activity with the entity. Economic activity may include the purchase of goods and/or services from the entity. Optimized transmission configuration data 128 may be determined by evaluating transmission configuration data 112 and statistics such as success metric. Optimizing transmission configuration data may include identifying a notification procedure, a timing element associated with a transmission strategy, type of transmission strategy, and the like.

With continued reference to FIG. 1, optimized transmission configuration data 128 may include at least a timing element, a quantity identifier, and a notification procedure.

As used in the current disclosure, a "notification procedure" is a plan to advertise the sale strategy to the consumer. A notification procedure may include the identification of the best method to communicate with the plurality of signal destinations 116. This may include things like push notifications, emails, text messages, phone calls, commercials, internet advertisements, social media advertisements, television advertisements, radio advertisements, podcast advertisements, and the like. A notification procedure may be selected as a function of the responsiveness of the plurality of signal destinations. This may be measured through the use of hyperlinks, the number of views, number of clicks, surveys, total sales, discount codes, and the like. Generating an optimized transmission configuration data 128 may additionally include generating a quantity identifier. As used in the current disclosure, a "quantity identifier" is an identification of the discount magnitude that may be implemented by entity. A quantity identifier may include the type of sale and how the cost associated with the product will be reduced. Types of sales strategies include temporary price reduction, free shipping/free returns, flash sales, bulk sales (i.e. the more you buy the more you save), product giveaways, loyalty programs, coupons, competitions, price matching, holiday promotions, and the like. A quantity identifier may include an identification of the price reduction and how long the price will be reduced in a temporary price reduction of the price of goods and services of an entity. In a non-limiting example, a quantity identifier may identify that the price of a product will be reduced by 50% for the next two days. A price reduction may be identified as a function of the profit margins associated with the goods or services. This may be done so that the entity will not take an undesired loss of profit on the product. Optimized transmission configuration data 128 may additionally include a time element. As used in the current disclosure, a "time element" is an identification of when the transmission strategy and/or sales strategy should be implemented and how long it should be implemented for. A time element may additionally include a prediction of when the consumer is most likely to engage in economic activity. For example, a time element may indicate that the plurality of signal destinations will be more incentivized to engage in economic activity during the second week of August for children's clothes. This economic activity may be associated with the beginning of the academic school year for students in the area. A time element may indicate that a sale is appropriate from Friday to Monday of the second week of August. A time element may be determined by evaluating the historical sales of goods and services in previous years in a geographic location. That may be done in conjunction with user statistics to make these predictions.

With continued reference to FIG. 1, processor 104 may generate optimized transmission configuration data 128 using a transmission machine-learning model 132. As used in the current disclosure, a "transmission machine-learning model" is a machine-learning model that is configured to generate optimized transmission configuration data 128. Transmission machine-learning model 132 may be consistent with the classifier described below in FIG. 2. Inputs to the transmission machine-learning model 132 may include an entity profile 108, transmission configuration data 112, signal destinations 116, return signals 124, success metrics, and the like. Outputs to the transmission machine-learning model 132 may include optimized transmission configuration data 128. Transmission training data is a plurality of data entries containing a plurality of inputs that are correlated to a plurality of outputs for training a processor by a machine-learning process. Transmission training data may include transmission configuration data 112 and return signals 124 correlated to examples of optimized transmission configuration data 128. Transmission training data may include transmission configuration data 112, digital footprints associated with signal destinations 116, and return signals 124 correlated to examples of optimized transmission configuration data 128. In an embodiment, transmission training data may comprise a plurality of transmission configuration data 112 and success metrics correlated to examples of optimized transmission configuration data 128. In an embodiment, transmission training data may comprise a plurality of signal destinations 116, transmission configuration data 112, and/or return signals 124 correlated to examples of optimized transmission configuration data 128. Transmission training data may be received from database 300. Transmission training data may contain information about an entity profile 108, transmission configuration data 112, signal destinations 116, user statistics, success metrics, examples of optimized transmission configuration data 128, and the like. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, the processor may be configured to generate a machine-learning model, such as transmission machine-learning model 132, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. processor 104 may then calculate a likelihood table by calculating probabilities of different data entries and classification labels. processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a machine-learning model, such as transmission machine-learning model 132, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, processor 104 may be configured to generate a transmission score as a function of the optimized transmission configuration data 128. As used in the current disclosure, a "transmission score" is a scoring of the optimized transmission configuration data 128, wherein the score reflects the likelihood of success of the optimized transmission configuration data 128. A strategy score may reflect the likelihood that a given optimized transmission configuration data 128 will entice a consumer to engage in economic activity. A strategy score may also reflect the likelihood a consumer will engage in economic activity as a function of a time element, marketing strategy, or quantity identifier. A strategy score may be calculated using a numerical scale. A non-limiting example, of a numerical scale, may include a scale from 1-10, 1-100, 1-1000, and the like, wherein a rating of 1 may represent a less favorable chance of a user engaging in economic activity, whereas a rating of 10 may represent a highly favorable chance of a user engaging in economic activity. A strategy score may be generated from transmission configuration data 112, user statistics, a plurality of signal destinations 116, and the like. A strategy score may be generated using a machine learning model. The machine learning model may be trained using score training data. Score training data may include a plurality of data entries containing a plurality of inputs that are correlated to a plurality of outputs for training a processor by a machine-learning process to classify optimized transmission configuration data 128 to a strategy score. Score training data may comprise data entries correlating optimized transmission configuration data 128 to examples of a strategy score. Score training data may comprise data entries correlating a plurality of signal destinations 116 and optimized transmission configuration data 128 to a plurality of examples of a strategy scores. Score training data may comprise data entries correlating return signals and optimized transmission configuration data 128 to a plurality of examples of a strategy scores. In other embodiments, Score training data may comprise data entries correlating one or more of timing element, a quantity identifier, and a notification procedure to examples of a strategy score. Score training data may be received from database 300. Score training data may contain information about entity profile 108, transmission configuration data 112, plurality of signal destinations, user statistics, optimized transmission configuration data 128 examples of strategy scores, and the like. Score training data may additionally be generated from any historical versions of any data described herein.

With continued reference to FIG. 1, processor 104 may determine a common acquisition signal 136 associated with the plurality of signal destinations 116 as a function of the optimized transmission configuration data 128. As used in the current disclosure, a "common acquisition signal" is a communication parameter set associated with a threshold probability of further return signal generation. A common acquisition signal 136 may be a condition or a set of conditions wherein the consumer chooses to engage in economic activity. Each condition may additionally be associated with an acquisition score which reflects the likelihood a consumer will engage in economic activity. The acquisition score may be a numerical score or a percentage that reflects the likelihood that a consumer will participate in economic activity. Conditions may be specific to the optimized transmission configuration data 128 of the plurality of signal destinations 116. In a non-limiting example, a common acquisition signal 136 for a plurality of signal destinations 116 may comprise two conditions. These conditions may include when the price of the good or service is 25% below the standard retail price combined with a notification to the plurality of signal destinations 116, based on the optimized transmission configuration data 128. Then the common acquisition signal 136 may indicate that the consumer has a 68% probability of purchasing the good or service. Examples of conditions may include price reductions, consumer notifications (i.e. text, email, push notifications, etc.), consumer geographic location, the level of need for the good or service, brand reputation, convenience to the consumer, and the like. In an embodiment, processor 104 may be configured to generate a common acquisition signal 136 as a function of control group. A common acquisition signal 136 may include a comparison of a plurality of signal destinations 116 which has been exposed to the optimized transmission configuration data 128 and control group which has not been exposed to any transmission strategy or an old transmission strategy. A common acquisition signal 136 may include a comparison of a plurality of signal destinations 116 which has been exposed to the transmission configuration data 112 and control group which has not been exposed to any transmission strategy. This comparison may be used to show the effectiveness of a common acquisition signal 136. Processor 104 may generate conditions based on previous iterations of the plurality of signal destinations 116. A. In an embodiment, a common acquisition signal 136 may be described in terms of a quantity of economic interest shown by a plurality of signal destinations 116 prior to engaging in economic activity. As used in the current disclosure, "economic interest" is a consumer's engagement with an entity. Economic interest may include visiting a store, or website, engaging in social media posts, viewing emails, clicking links, activity on a website or app (i.e. placing the item in a cart or sharing the website), and the like. In a non-limiting example, a common acquisition signal 136 may provide an indication that for every 20 consumers that click on a product's link, a consumer will purchase one good. Additionally, a common acquisition signal 136 may provide an indication of what conditions promote economic interest. Continuing the above non-limiting example, common acquisition signal 136 may indicate that when the price of the goods are reduced economic interest subsequently increases by a given percentage. Processor 104 may determine the economic interest of plurality of signal destinations 116 by evaluating the plurality of signal destinations 116 digital footprint. Processor 104 may compare the current plurality of signal destination's digital footprint to previous iterations of plurality of signal destination's digital footprint.

With continued reference to FIG. 1, generating optimized transmission configuration data 128 may include determining a common acquisition signal 136 using an acquisition machine-learning model 140. As used in the current disclosure, an "acquisition machine-learning model" is a machine-learning model that is configured to determine a common acquisition signal 136. Acquisition machine-learning model 140 may be consistent with the machine learning model described below in FIG. 2. Inputs to the acquisition machine-learning model 140 may include an entity profile 108, transmission configuration data 112, plurality of signal destinations 116, return signals 124, success metrics, optimized transmission configuration data 128, and the like. Outputs to the acquisition machine-learning model 140 may include a common acquisition signal 136. Acquisition training data is a plurality of data entries containing a plurality of inputs that are correlated to a plurality of outputs for training a processor by a machine-learning process. In an embodiment, acquisition training data may comprise return signals 124 and or success metrics correlated to examples of common acquisition signals 136. Acquisition training data may be received from database 300. Acquisition training data may contain information about an entity profile 108, transmission configuration data 112, plurality of signal destinations 116, user statistics, examples of common acquisition signals 136, and the like. In an embodiment, Acquisition training data may be iteratively updated based on the input and output results of the acquisition machine-learning model.

With continued reference to FIG. 1, a machine-learning model, such as an acquisition machine-learning model, may be implemented as a fuzzy inferencing system. As used in the current disclosure, a "fuzzy inference" is a method that interprets the values in the input vector (i.e., return signals 124 and transmission configuration data 112) and, based on a set of rules, assigns values to the output vector. The fuzzy inference may be consistent with the fuzzy inference described below in FIG. 6. A set of fuzzy rules may include a collection of linguistic variables that describe how the system should make a decision regarding classifying an input or controlling an output. An example of linguistic variables may include variables that represent common acquisition signal 136. In an embodiment, linguistic variables may be used to depict the predicted interest of plurality of signal destinations 116 in engaging in economic activity. Examples of linguistic variables may include terms such as "Unlikely to Engage in Economic Activity," "Moderately Likely to Engage in Economic Activity," and "Highly Likely to Engage in Economic Activity." The common acquisition signal 136 may be determined by a comparison of the degree of match between a first fuzzy set and a second fuzzy set, and/or single values therein with each other or with either set, which is sufficient for purposes of the matching process.

With continued reference to FIG. 1, processor 104 may be configured to generate an acquisition score as a function of the common acquisition signal 136. As used in the current disclosure, an "acquisition score" is a scoring of the common acquisition signal 136, wherein the score reflects the likelihood of a plurality of signal destinations 116 engaging in returning a successful return signal. An acquisition score may reflect the likelihood that a given signal destination 116 will make a purchase under a given set of conditions based on optimized transmission configuration data 128. An acquisition score may be calculated using a numerical scale. A non-limiting example, of a numerical scale, may include a scale from 1-10, 1-100, 1-1000, and the like, wherein a rating of 1 may represent a less favorable chance of a user engaging in economic activity, whereas a rating of 10 may represent a highly favorable chance of a user engaging in economic activity. An acquisition score may be generated from common acquisition signal 136, user statistics, optimized transmission configuration data 128, plurality of signal destinations 116, digital footprint, and the like. An acquisition score may be generated using a machine-learning model. The machine learning model may be trained using acquisition score training data. Acquisition score training data may include a plurality of data entries containing a plurality of inputs that are correlated to a plurality of outputs for training a processor by a machine-learning process. In an embodiment, acquisition score training data may comprise a plurality of common acquisition signals 136 correlated to a plurality of examples of acquisition scores. Acquisition score training data may be received from database 300. Acquisition score training data may contain information about an entity profile 108, transmission configuration data 112, signal destinations 116, user statistics, optimized transmission configuration data 128, the common acquisition signals 136, examples of acquisition scores, and the like. Acquisition score training data may additionally be generated from any historical versions of any data described herein.

With continued reference to FIG. 1, processor 104 may be configured to apply the optimized transmission configuration data 128 to the plurality of signal destinations 116. Applying the optimized transmission configuration data 128 to plurality of signal destinations 112 may include an implementation of the optimized transmission configuration data 128. Application of optimized transmission configuration data 128 may be used to identify if a plurality of signal destinations 116 will engage in economic activity under one or more conditions and at different price points. Processor 104 may be configured to apply the optimized transmission configuration data 128 to the plurality of signal destinations 116 using a strategy simulation. As used in the current disclosure, a "strategy simulation" is a simulation of how a plurality of signal destinations 116 will respond to optimized transmission configuration data 128. A strategy simulation may include a theoretical construct representing a variety of business processes by a set of variables and a set of logical and/or quantitative relationships between them. The simulation may be run multiple times to ensure accuracy, for instance and without limitation by randomizing parameters in a Monte Carlo simulation and the like. The results of the strategy simulation may be charted. The strategy simulation may include a simplified framework designed to illustrate complex processes. Frequently, a strategy simulation may posit several parameters, including price point, length of sale, time element, marketing plan, and the like. A strategy simulation may compare the effect of the parameter on a plurality of signal destinations 116 as compared to a control group. A control group may not be exposed to the optimized transmission configuration data 128 or any other transmission strategy. In some embodiments, control group may be exposed to unoptimized transmission configuration data. In some embodiments, a control group may be exposed to one or more parameters at a time. A strategy simulation may simulate the economic activity of the control group under similar conditions as the plurality of signal destinations 116 but without a change in any parameters. A control group is a predetermined variation of a plurality of signal destinations for comparison against other variations of plurality of signal destinations. A model may have various exogenous variables, and those variables may change to create various responses by economic variables. A strategy simulation may be configured to include investigation, theorizing, and fitting theories to the world. A strategy simulation may include an economic model, a stochastic model, a non-stochastic model, a qualitative model, and the like. A strategy simulation may be configured to simulate every aspect of a business, this may include consumer engagement, sales, website activity, economic interest, economic activity, and the like. A strategy simulation may be configured to apply a plurality of common acquisition signals 136 to the plurality of signal destinations 116. In some embodiments, the application of the plurality of the optimized transmission configuration data 128 may be used to identify a common acquisition signal 136. In a non-limiting example, a strategy simulation may be used to identify when members of the plurality of signal destinations will engage in economic activity. The processor may be configured to compile the conditions where members of the plurality of signal destinations 116 decided to engage in economic activity. This may be used to determine if a notification procedure was effective or how well each time element worked. The compiled conditions may be combined with the data regarding what percentage of the plurality of signal destinations 116 engaged in economic activity in response to those conditions to generate a common acquisition signal. A strategy simulation may be configured to simulate the impact of the implementation of optimized transmission configuration data 128 on an entity's business over a given time. The impact of the impact of the implementation of optimized transmission configuration data 128 may be determined as a function of a comparison to the control group. The impact may be measured as the difference in economic activity between the plurality of signal destinations 116 that has been exposed to the optimized transmission configuration data 128 and a control group which has not been exposed to the optimized transmission configuration data 128. A strategy simulation may simulate one or more aspects of a business over a given time. A strategy simulation may be configured to generate updated optimized transmission configuration data based on the inputs and outputs from a strategy simulation. As used in the current disclosure, "updated optimized transmission configuration data" is optimized transmission configuration data 128 that is generated using a strategy simulation. The updated optimized transmission configuration data may be re-applied to the plurality of signal destinations 116 with the goal of improving economic activity among the plurality of signal destinations. This may include modifying any aspect of the optimized transmission configuration data 128, including a quantity identifier, notification procedure, or time element.

With continued reference to FIG. 1, processor 104 may be configured to send out further outgoing signals 120 as a function of optimized transmission configuration data 128 to signal destinations 116. In some embodiments, processor 104 may send out some outgoing signals 120 to a portion of signal destinations as a function of optimized transmission configuration data 128, whereas a second portion of signal destinations may be sent outgoing signals 120 as a function of transmission configuration data 112. In some embodiments, a third portion (i.e. a control) of signal destinations may not be exposed to a transmission configuration data 112 and/or transmission strategy. Processor 104 may be further configured to continue to optimize optimized transmission configuration data 128 in an iterative manner. This may include sending out outgoing signals 120 with optimized transmission configuration data 128 and using return signals 124 that are received in response to generate even more optimized transmission configuration data. Transmission machine-learning model 132 and acquisition machine-learning model 140, or any other machine learning model above may be used iteratively to further optimize optimized transmission configuration data. Prior versions of signal destinations 116, return signals 124, transmission configuration data 112, common acquisition signals 136, and/or optimized transmission configuration data 128 may be used as feedback to further train the machine learning models disclosed herein.

Still referring to FIG. 1, processor 104 may be configured to display common acquisition signals 136 using a display device 144. As used in the current disclosure, a "display device" is a device that is used to display a plurality of data or other content. A display device 144 may be configured to display any data described herein. Display device 144 may include a user interface. A "user interface," as used herein, is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. A display device may be remote from processor 104. In an embodiment, processor 104 may be configured to transmit any data disclosed herein to a display device or a remote display device. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Figure 2:
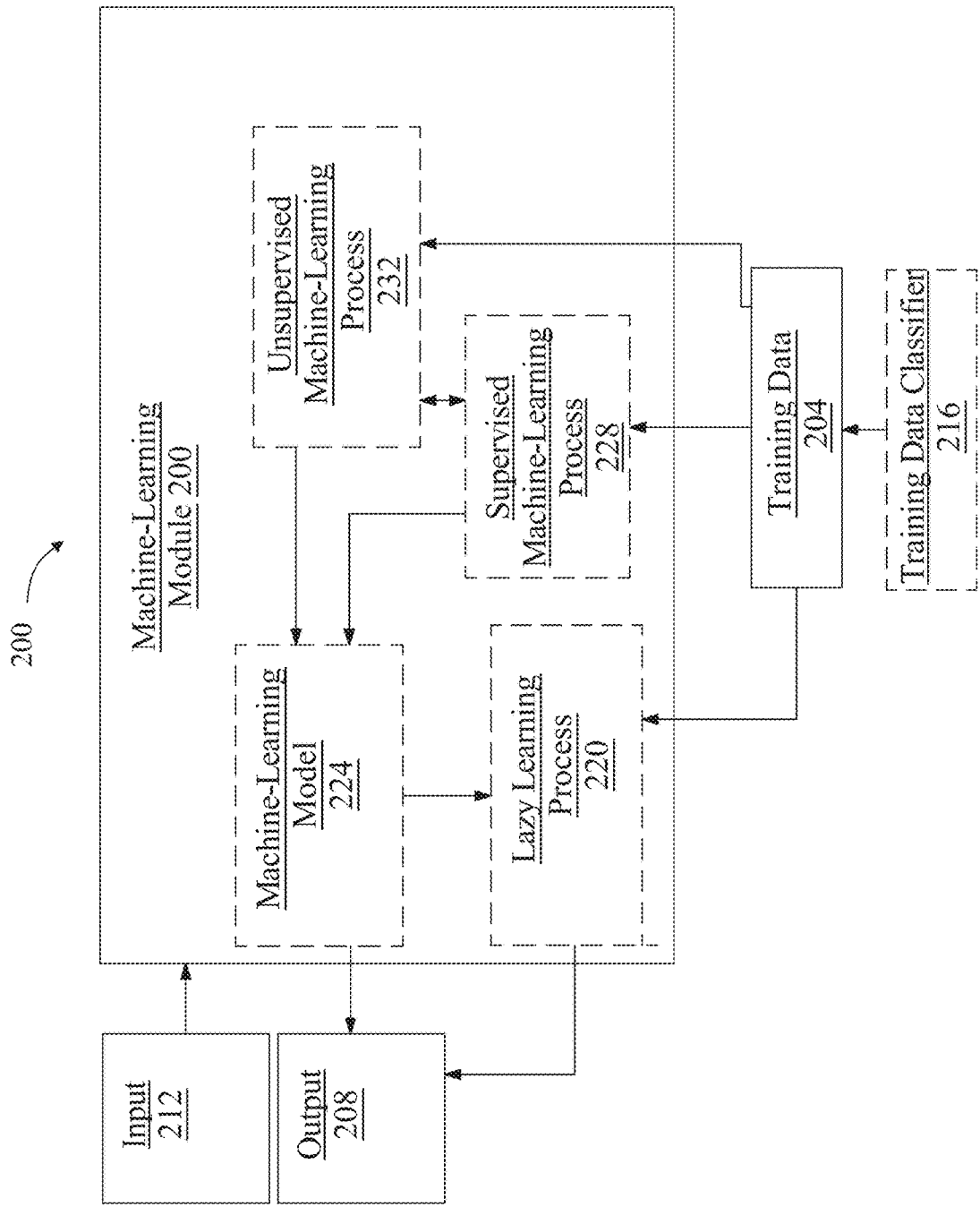
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning modules may perform determinations, classification, and/or analysis steps, methods, processes, or the like as described in this disclosure using machine-learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
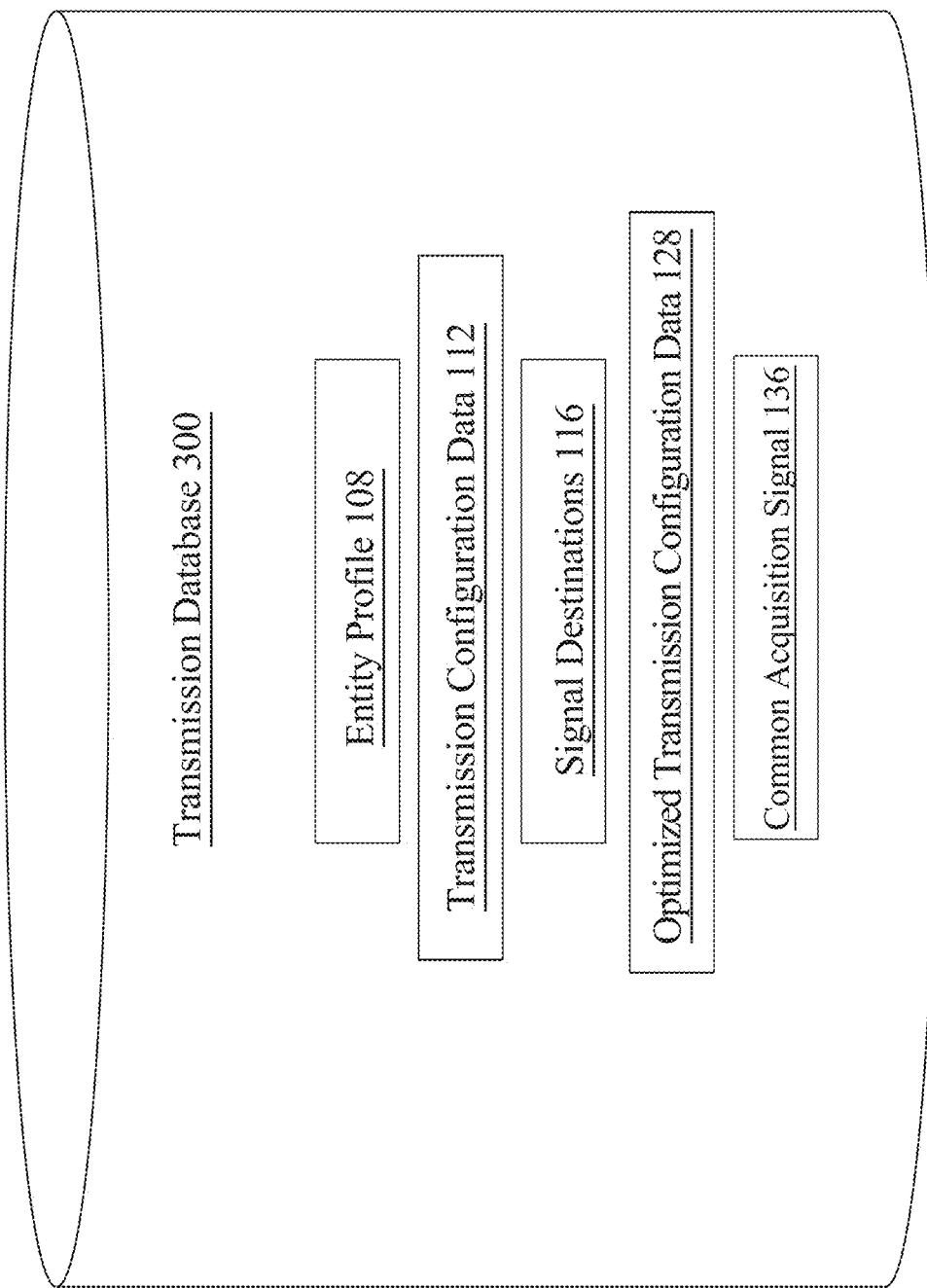
FIG. 3 is a block diagram of an exemplary embodiment of a transmission database.

Now referring to FIG. 3, an exemplary transmission database 300 is illustrated by way of block diagram. In an embodiment, any past or present versions of data disclosed herein may be stored within entity profile 108, transmission configuration data 112, target data 116, user statistics, optimized transmission configuration data 128, the common acquisition signals 136, acquisition scores, digital footprints, and the like. In an embodiment, any data disclosed within the entirety of this application may be located within database 300. Processor 104 may be communicatively connected with transmission database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network. Transmission database 300 may be implemented, without limitation, as a relational database, a key-value retrieval database such as a NOSQL database, or any other format or structure for use as a database that a person skilled in the art would recognize as suitable upon review of the entirety of this disclosure. Transmission database 300 may alternatively or additionally be implemented using a distributed data storage protocol and/or data structure, such as a distributed hash table or the like. Transmission database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
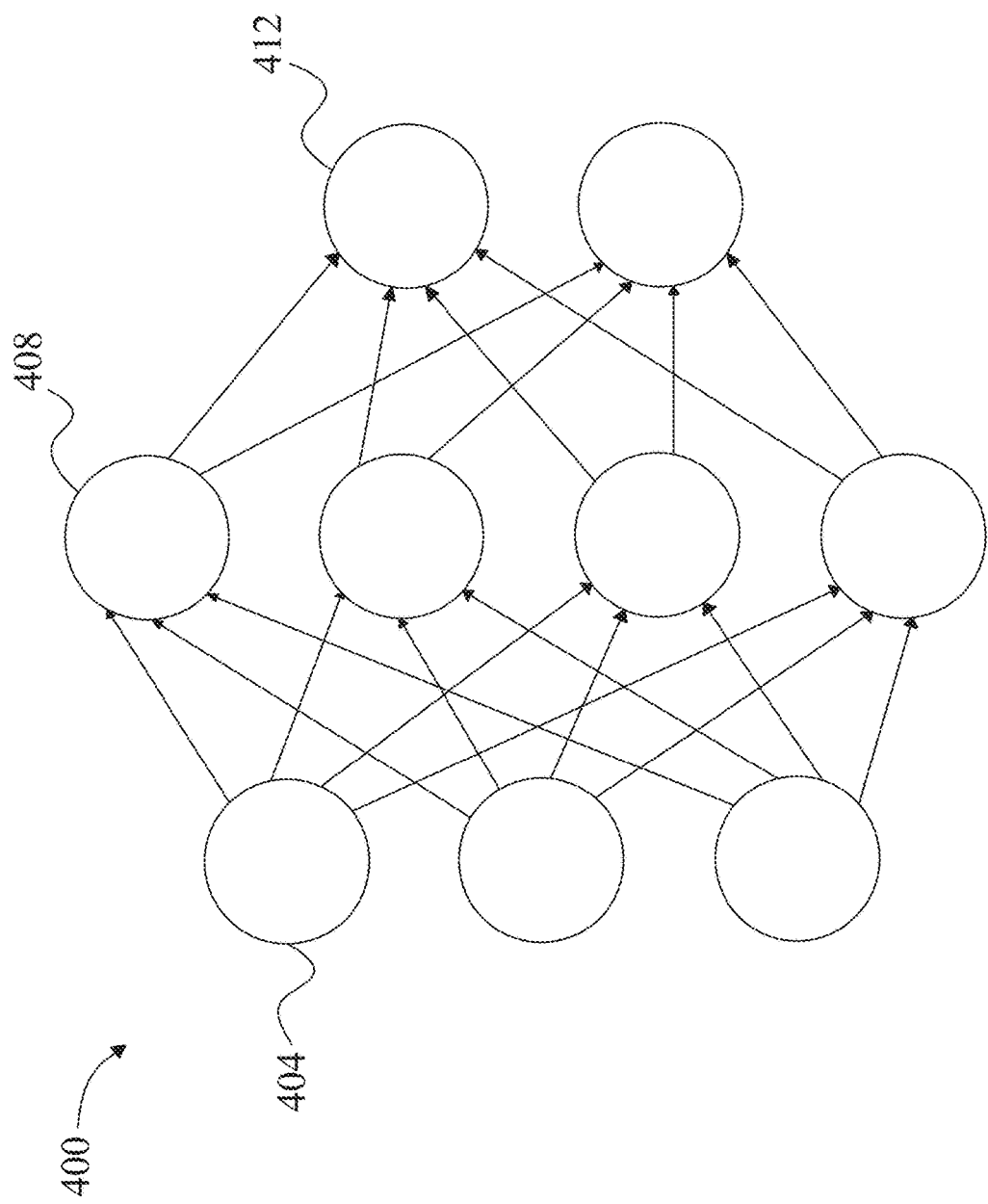
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
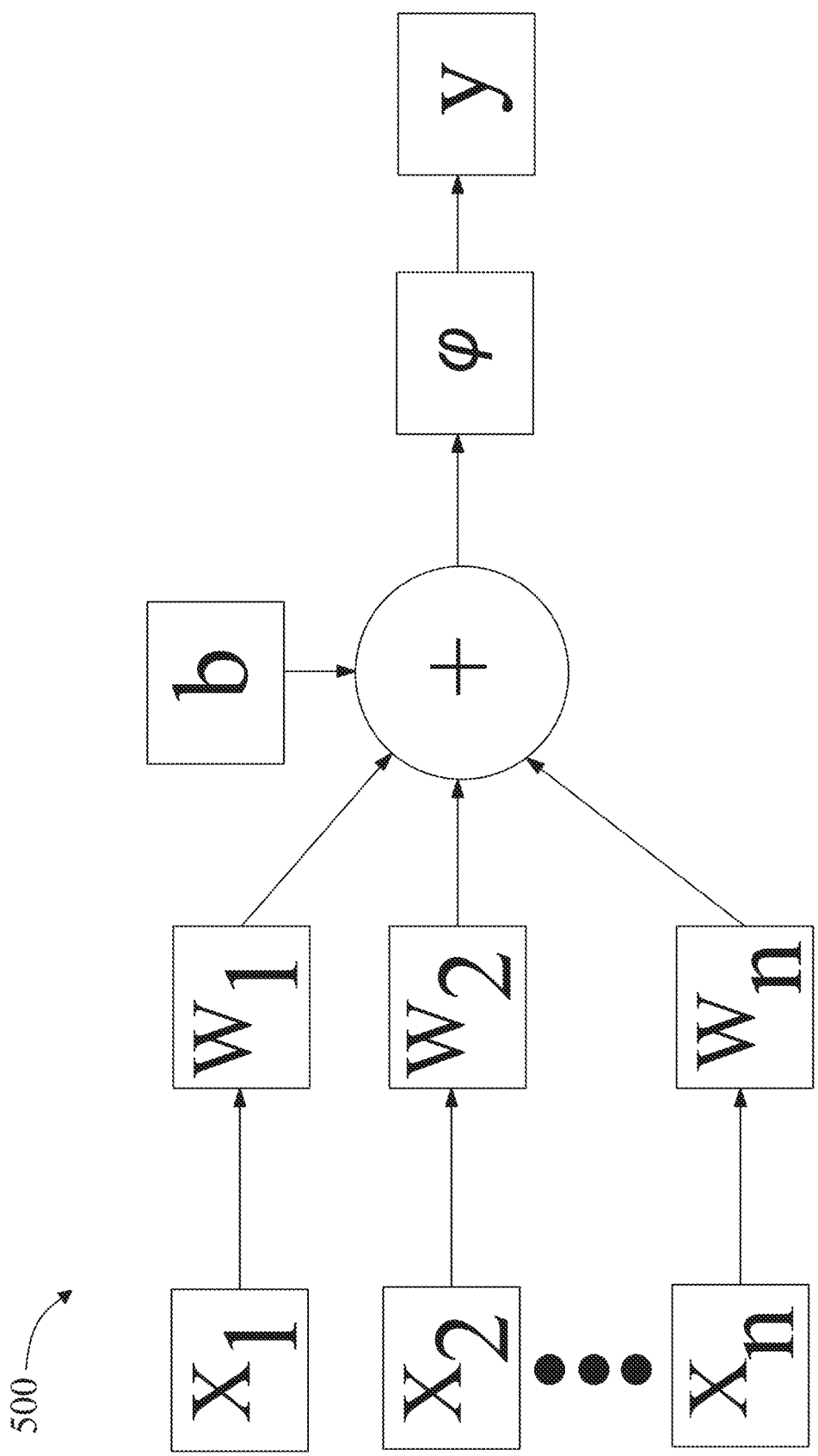
FIG. 5 is a diagram of an exemplary embodiment of a node of a neural network.

Referring now to FIG. 5, an exemplary embodiment of a node of a neural network is illustrated. A node may include, without limitation, a plurality of inputs x; that may receive numerical values from inputs to a neural network containing the node and/or from other nodes. Node may perform a weighted sum of inputs using weights w; that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or an "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
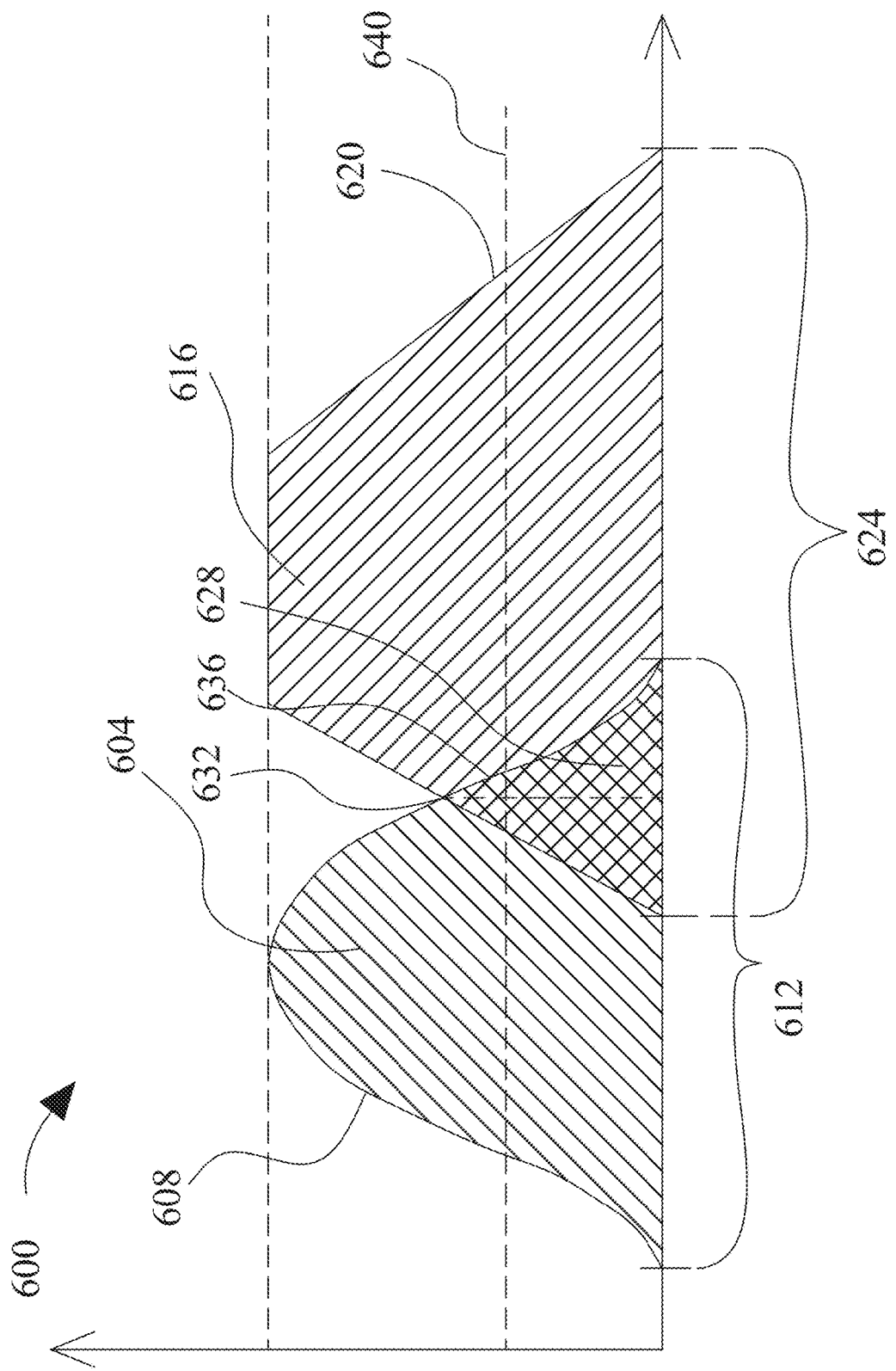
FIG. 6 an illustration of an exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent transmission configuration data 112 and examples of common acquisition signal 136 from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input transmission configuration data 112 and examples of common acquisition signal 136. For instance, an acceptance variable may represent a first measurable value pertaining to the classification of transmission configuration data 112 to examples of common acquisition signal 136. Continuing the example, an output variable may represent a common acquisition signal 136 tailored to the entity profile 108. In an embodiment, transmission configuration data 112 and/or examples of common acquisition signal 136 may be represented by their own fuzzy set. In other embodiments, common acquisition signal 136 may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T (c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any optimized transmission configuration data 112 and examples of common acquisition signal 136. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, a common acquisition signal 136 may indicate a sufficient degree of overlap with fuzzy set representing transmission configuration data 112 and examples of common acquisition signal 136 for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both transmission configuration data 112 and examples of common acquisition signal 136 have fuzzy sets, common acquisition signal 136 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
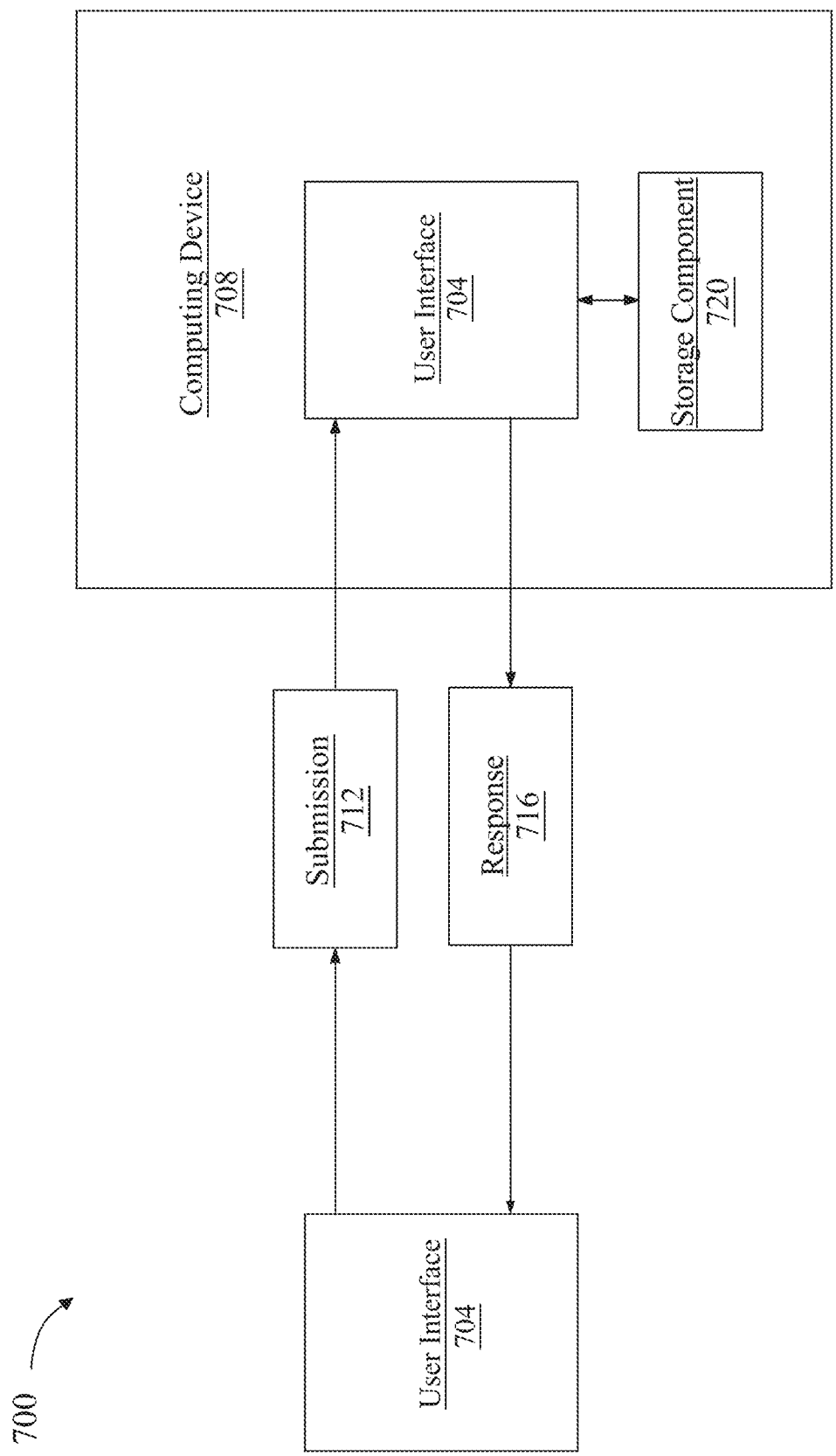
FIG. 7 is an illustration of an exemplary embodiment of a chatbot.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. Alternatively or additionally, user interface 704 may communicate with user device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 708 to the chatbot, and a response 716, from the chatbot to the user interface 704. In many cases, one or both of submission 712 and response 716 are text-based communication. Alternatively or additionally, in some cases, one or both of submission 712 and response 716 are audio-based communication.

Continuing in reference to FIG. 7, a submission 712 once received by computing device 708 operating a chatbot, may be processed by a processor. In some embodiments, processor may process a submission 712 using one or more of keyword recognition, pattern matching, and natural language processing. In some embodiments, processor may employ real-time learning with evolutionary algorithms. In some cases, processor may retrieve a pre-prepared response from at least a storage component 720, based upon submission 712. Alternatively or additionally, in some embodiments, processor communicates a response 716 without first receiving a submission 712, thereby initiating conversation. In some cases, processor communicates an inquiry to user interface 704; and the processor is configured to process an answer to the inquiry in a following submission 712 from the user interface 704. In some cases, an answer to an inquiry present within a submission 712 from a user device 704 may be used by computing device 708 as an input to another function.

With continued reference to FIG. 7, A chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, data base, or other data structure to respond to the users entry into the chatbot as a function of a chatbot input. As used in the current disclosure, "Chatbot input" is any response that a candidate or employer inputs into a chatbot as a response to a prompt or question.

With continuing reference to FIG. 7, computing device 708 may be configured to respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 708 may generate two or more decision trees, which may overlap; for instance, a root node of one tree may connect to and/or receive output from one or more terminal nodes of another tree, intermediate nodes of one tree may be shared with another tree, or the like.

Still referring to FIG. 7, computing device 708 may build decision tree by following relational identification; for example, relational indication may specify that a first rule module receives an input from at least a second rule module and generates an output to at least a third rule module, and so forth, which may indicate to computing device 708 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 708 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 7, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 8:
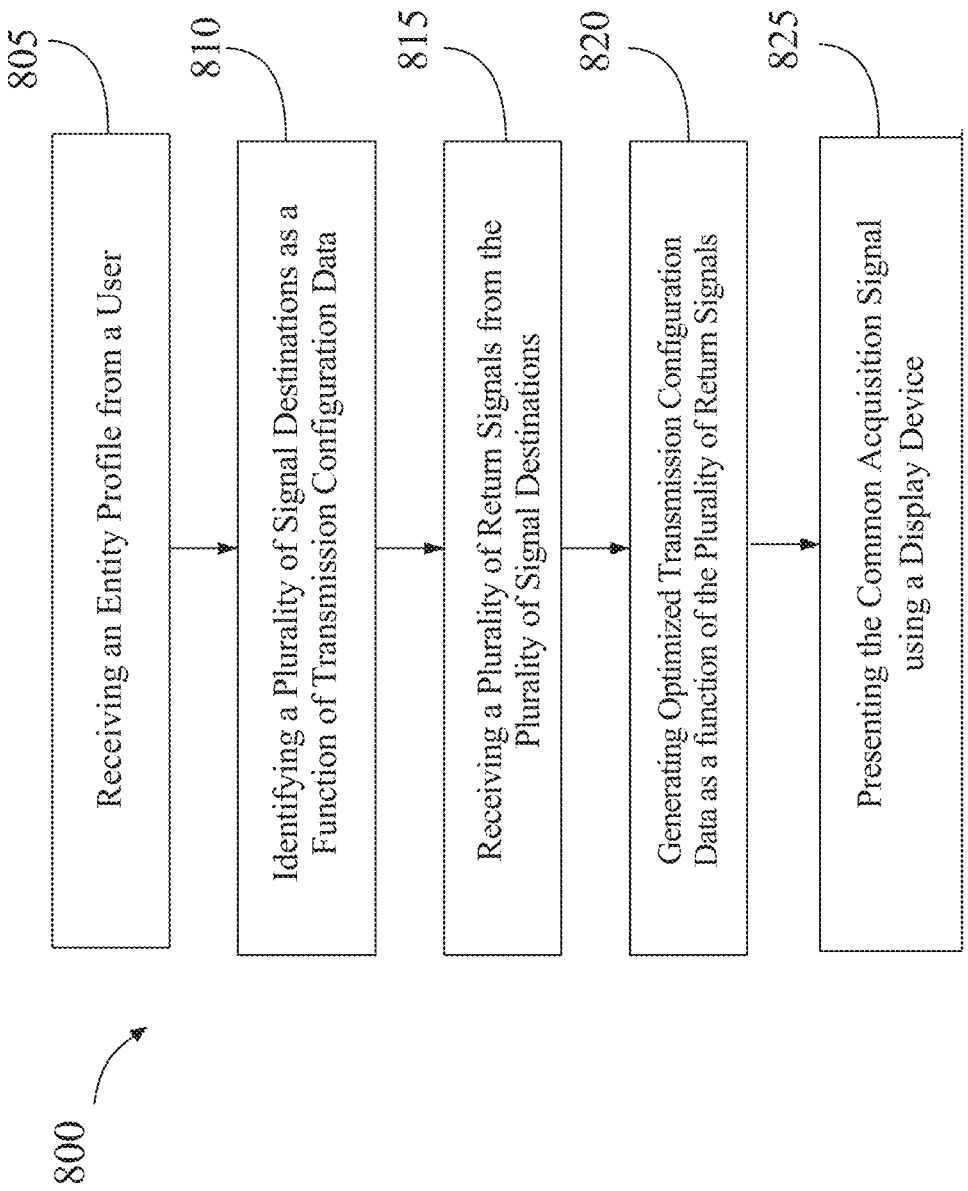
FIG. 8 is a flow diagram of an exemplary method for identifying a common acquisition signal.

Referring now to FIG. 8, a flow diagram of an exemplary method 800 for identifying a common acquisition signal is illustrated. At step 805, method 800 includes receiving, using at least a processor, an entity profile from a user, wherein the entity profile comprises a plurality of transmission configuration data. This may be implemented as described with reference to FIGS. 1-8. In some embodiments, extracting the entity profile may comprise extracting the entity profile using a WebCrawler or a chatbot.

Still referring to FIG. 8, at step 810, method 800 includes identifying, using the at least a processor, a plurality of signal destinations as a function of the transmission configuration data. This may be implemented as described with reference to FIGS. 1-8. In an embodiment, the method may include identifying, using the at least a processor, the plurality of signal destinations as a function of a user statistic. In another embodiment, identifying the plurality of signal destinations may comprise identifying a digital footprint associated with a plurality of signal destinations.

Still referring to FIG. 8, at step 815, method 800 includes receiving a plurality of return signals from the plurality of signal destinations. This may be implemented as described with reference to FIGS. 1-8.

Still referring to FIG. 8, at step 820, method 800 includes generating, using the at least a processor, the optimized transmission configuration data as a function of the plurality of return signals. This may be implemented as described with reference to FIGS. 1-8. In an embodiment, the method comprises generating, using the at least a processor, the optimized transmission configuration data using a transmission machine learning model. The transmission machine learning model may be configured to be trained using transmission training data, wherein the transmission training data contains plurality of data entries containing return signals as inputs correlated to a plurality of optimized transmission configuration data sets as outputs. The transmission machine learning model may be configured to generate the optimized transmission configuration data as a function of the plurality of return signals using the transmission machine learning model. In an embodiment, the optimized transmission configuration data may comprise a quantity identifier, a notification procedure, and/or a time element.

Still referring to FIG. 8, step 820 additionally includes determining a common acquisition signal associated with the plurality of signal destinations as a function of the optimized transmission configuration data. This may be implemented as described and reference to FIGS. 1-8. In an embodiment, determining the common acquisition signal may comprise applying the transmission configuration data to the plurality of signal destinations and determining an acquisition signal for each member of the plurality of signal destinations as a function of the application. In an embodiment, method 800 may include generating, using the at least a processor, an acquisition score as a function of the common acquisition signal.

Still referring to FIG. 8, at step 825, method 800 includes displaying, using the at least a processor, the common acquisition signal using a display device. This may be implemented as described with reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
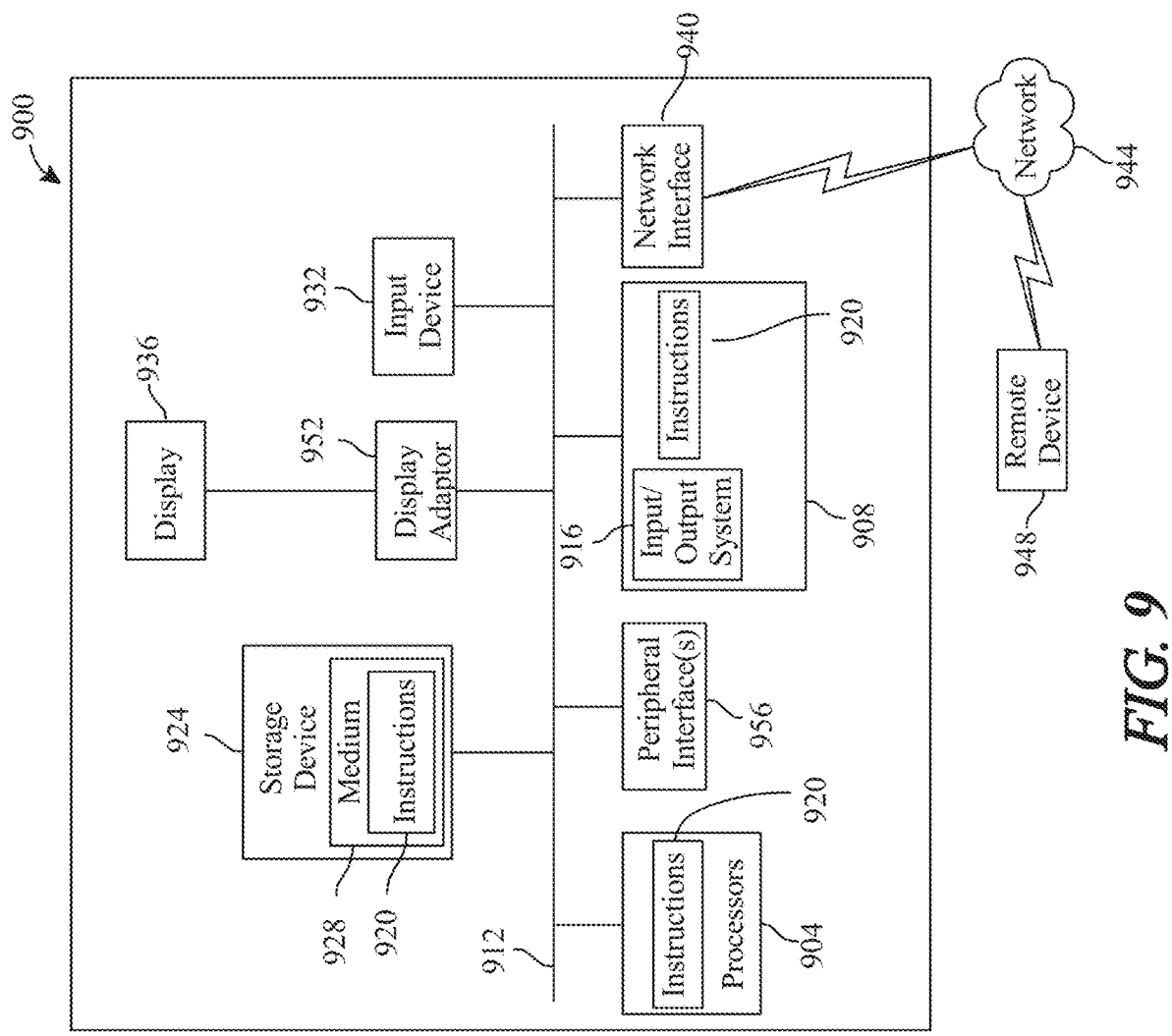
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for identifying a common acquisition signal, wherein the apparatus comprises:
    at least a processor; and
    a memory communicatively connected to the at least a processor, wherein the memory contains instructions configuring the at least a processor to:
        receive an entity profile from a user, wherein the entity profile comprises a plurality of transmission configuration data, wherein receiving the entity profile comprises:
            generating a questionnaire;
            transmitting the questionnaire to a user though a chatbot; and
            generating the entity profile based on a received answer through the chatbot;
        identify a plurality of signal destinations as a function of the transmission configuration data;
        receive a plurality of return signals from the plurality of signal destinations;
        generate optimized transmission configuration data as a function of the plurality of return signals, wherein the optimized transmission configuration data comprises a notification procedure, wherein the notification procedure comprises an identification of a preferred method for communicating with the plurality of signal destinations;
        generate, using a strategy simulation, updated optimized transmission configuration data, wherein the strategy simulation;
            posits several parameters, including at least a marketing plan;
            simulates aspects of a business including economic interest and economic activity; and
            compares the effect of the several parameters on a plurality of signal destinations by measuring a difference in at least economic activity between the plurality of signal destinations that has been exposed to the optimized transmission configuration data and a control group which has not been exposed to the optimized transmission configuration data;
        determine a common acquisition signal associated with the plurality of signal destinations as a function of the updated optimized transmission configuration data; and
        present the common acquisition signal using a display device.

2. The apparatus of claim 1, wherein determining the optimized transmission configuration data comprises:
    applying the transmission configuration data to the plurality of signal destinations; and
    determining an acquisition signal for the plurality of signal destinations as a function of the application.

3. The apparatus of claim 1, wherein generating the optimized transmission configuration data comprises generating the optimized transmission configuration data using a transmission machine learning model.

4. The apparatus of claim 3, wherein generating the optimized transmission configuration data using the transmission machine learning model comprises:
    training the transmission machine learning model using transmission training data, wherein the transmission training data includes a plurality of data entries containing return signals as inputs correlated to a plurality of optimized transmission configuration data sets as outputs; and
    generating the optimized transmission configuration data as a function of the plurality of return signals using the trained transmission machine learning model.

5. The apparatus of claim 1, wherein the optimized transmission configuration data comprises a quantity identifier, the quantity identifier comprising a discount magnitude associated with one or more products offered by the user.

6. The apparatus of claim 1, wherein the memory includes instructions further configuring the processor to generate an acquisition score as a function of the common acquisition signal.

7. The apparatus of claim 1, wherein the optimized transmission configuration data comprises a time element.

8. The apparatus of claim 1, wherein identifying the plurality of signal destinations comprises identifying the plurality of signal destinations as a function of a user statistic.

9. The apparatus of claim 1, wherein:
   each of the plurality of signal destinations is associated with a digital footprint; and
   generating the optimized transmission configuration data comprises generating the optimized transmission configuration data as a function of the digital footprint.

10. A method for identifying a common acquisition signal, wherein the method comprises:
    receiving, using at least a processor, an entity profile from a user, wherein the entity profile comprises a plurality of transmission configuration data, wherein receiving the entity profile comprises:
        generating a questionnaire;
        transmitting the questionnaire to a user though a chatbot; and
        generating the entity profile based on a received answer through the chatbot;
    identifying, using the at least a processor, a plurality of signal destinations as a function of the transmission configuration data;
    receiving a plurality of return signals from the plurality of signal destinations;
        generating, using the at least a processor, optimized transmission configuration data as a function of the plurality of return signals, wherein the optimized transmission configuration data comprises a notification procedure, wherein the notification procedure comprises an identification of a preferred method for communicating with the plurality of signal destinations, wherein the strategy simulation:
            posits several parameters, including at least a marketing plan;
            simulates aspects of a business including economic interest and economic activity; and
            compares the effect of the several parameters on a plurality of signal destinations by measuring a difference in at least economic activity between the plurality of signal destinations that has been exposed to the optimized transmission configuration data and a control group which has not been exposed to the optimized transmission configuration data;
    generating, using the at least a processor, updated optimized transmission configuration data using a strategy simulation;
    determining, using the at least a processor, a common acquisition signal associated with the plurality of signal destinations as a function of the updated optimized transmission configuration data; and
    presenting, using the at least a processor, the common acquisition signal using a display device.

11. The method of claim 10, wherein:
    each of the plurality of signal destinations is associated with a digital footprint; and
    generating the optimized transmission configuration data comprises generating the optimized transmission configuration data as a function of the digital footprint.

12. The method of claim 10, wherein determining the optimized transmission configuration data comprises:
    applying the transmission configuration data to the plurality of signal destinations; and
    determining an acquisition signal for each member of the plurality of signal destinations as a function of the application.

13. The method of claim 10, further comprising generating, using the at least a processor, the optimized transmission configuration data using a transmission machine learning model.

14. The method of claim 13, wherein generating the optimized transmission configuration data using the transmission machine learning model:
    training the transmission machine learning model using transmission training data, wherein the transmission training data contains a plurality of data entries containing return signals as inputs correlated to a plurality of optimized transmission configuration data sets as outputs; and
    generating the optimized transmission configuration data as a function of the plurality of return signals using the transmission machine learning model.

15. The method of claim 10, wherein the optimized transmission configuration data comprises a quantity identifier, the quantity identifier comprising a discount magnitude associated with one or more products offered by the user.

16. The method of claim 10, further comprising generating, using the at least a processor, an acquisition score as a function of the common acquisition signal.

17. The method of claim 10, wherein the optimized transmission configuration data comprises a time element.

18. The method of claim 10, wherein identifying the plurality of signal destinations comprises identifying the plurality of signal destinations as a function of a user statistic.

* * * * *